June 23, 1936.  D. N. HALSTEAD  2,044,778
PIPE COATING MACHINE
Filed April 21, 1934  2 Sheets-Sheet 1
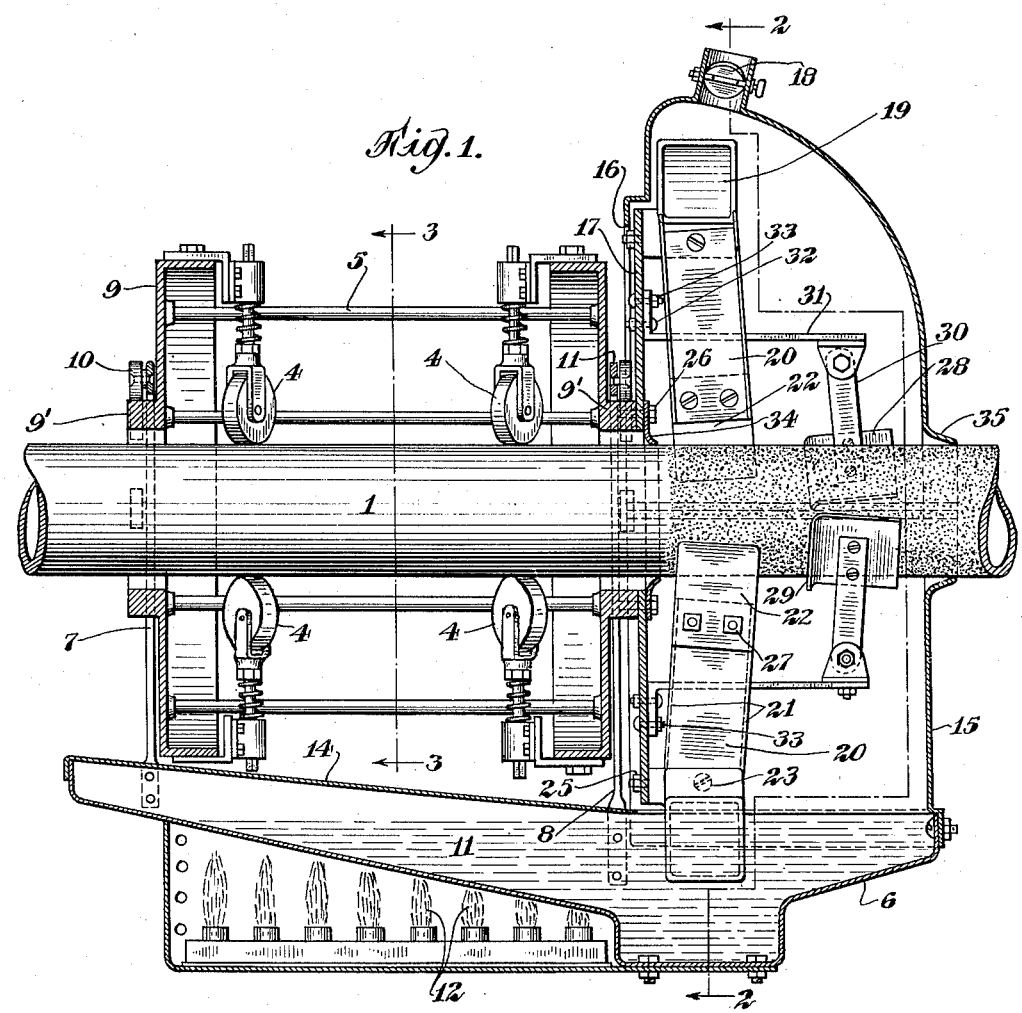
INVENTOR
Dorne N. Halstead.

June 23, 1936.  D. N. HALSTEAD  2,044,778
PIPE COATING MACHINE
Filed April 21, 1934   2 Sheets-Sheet 2
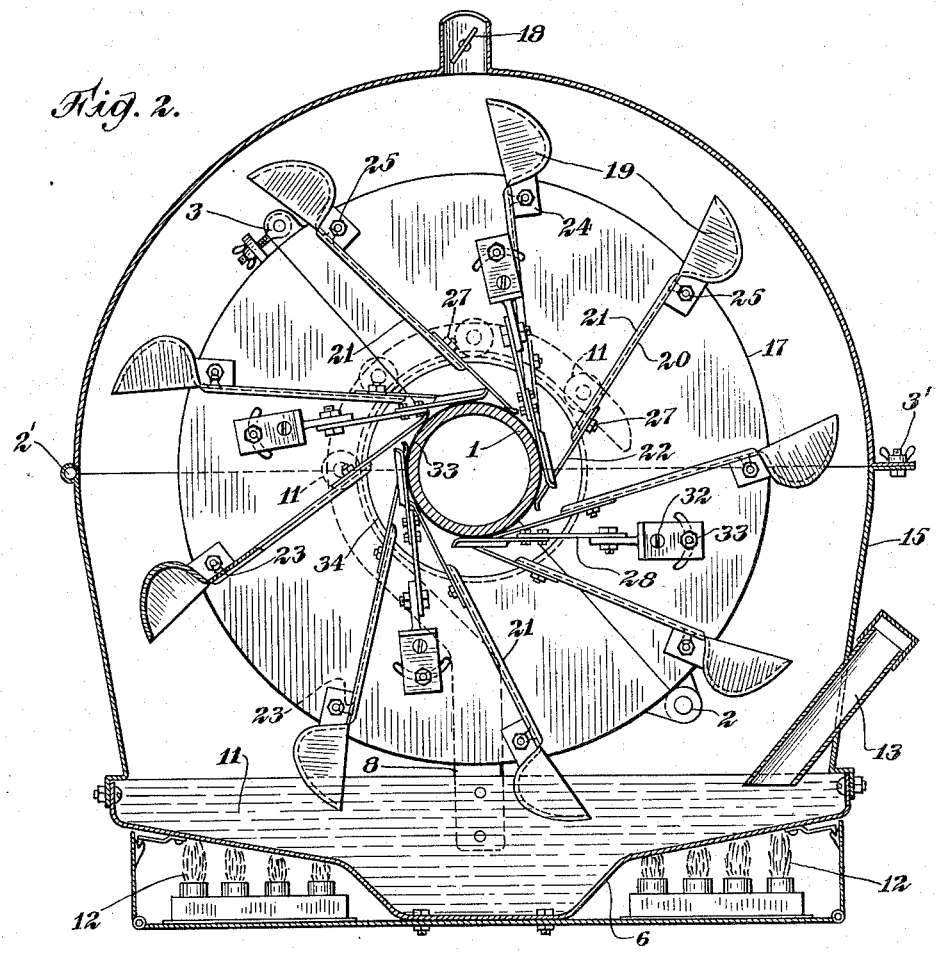
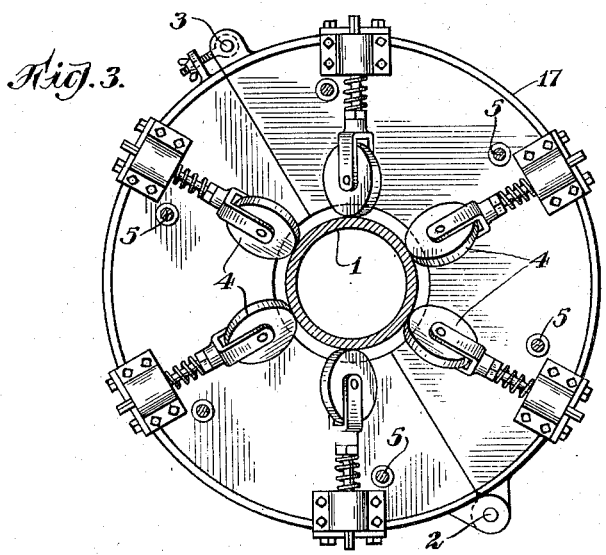
INVENTOR
Dorne N. Halstead.

Patented June 23, 1936

2,044,778

UNITED STATES PATENT OFFICE 2,044,778

PIPE COATING MACHINE

Dorne N. Halstead, Brooklyn, N. Y., assignor to Johns-Manville Corporation, New York, N. Y., a corporation of New York Application April 21, 1934, Serial No. 721,687

6 Claims. (Cl. 91—30)

This invention relates to a machine for coating a pipe or other cylindrical object and, particularly, to such a machine adapted to be mounted movably upon a pipe and to apply a hardenable coating fluid thereto at a position posterior to the place of mounting upon the pipe.

The use of pipes coated to minimize corrosion is increasing rapidly and many miles of pipeline have been constructed of such coated pipes. The coating comprises usually a relatively thick layer of plastic, non-corrodible material, of the type of asphalt, applied to the exterior of the pipe, and a wrapping of sheet material, such as roofing paper, disposed over the thick coating.

In applying the thick coating of asphalt or the like, it is conventional to swab the coating material by hand upon the pipe, to form a layer of desired depth. The inconvenience of such a method is obvious.

I have now devised a hand operated machine for applying the coating continuously to the outside of the pipe. In this machine the coating fluid is elevated mechanically, by means of a rotating frame provided with lifting buckets, and is poured upon the pipe at such a position that the coating does not come in contact with the rolling means for supporting the rotating frame upon the pipe.

It is an object of the invention to provide a machine for applying a coating fluid continuously to the outside of the pipe at a position posterior to the place of mounting of the machine upon the pipe. Another object is to provide a machine having a satisfactory and convenient means of maintaining a supply of hardenable coating fluid in mobile condition. A further object is to provide means for smoothing and eliminating flaws in the coating material applied to the pipe, first, while the coating material is in warm or fluent condition and, suitably, also after the coating material has been cooled substantially and thereby increased in viscosity. Other objects and advantages will appear from the following description and the appended claims.

An embodiment that is preferred is illustrated in the drawings, and the machine and its operation will be described in connection therewith.

In these drawings

Fig. 1 shows a longitudinal view of the machine mounted upon a pipe that is being coated, the view being partly in section and partly a side elevation;

Fig. 2 shows a cross sectional view on the broken sectional line 2—2 of Fig. 1, with portions broken away for clearness of illustration; and Fig. 3 shows a sectional view on line 3—3 of Fig. 1.

The pipe 1 is representative of a cylindrical object or pipe to be coated, upon which this machine travels. The pipe may be of large diameter and of the type used in crude oil pipelines.

The coating machine constitutes a cage-like frame 9 hinged at 2 and latched together at 3 surrounding the pipe and comprising means for supporting the machine upon the pipe in rotatable and forwardly movable manner. Such means comprise, preferably, a plurality of series of rollers 4 arranged around the pipe, as illustrated, and being of type and provided with mountings, supporting frames, and accessories that are of the type disclosed and described in the specification of U. S. Patent 1,883,401 issued to Rolfs and Fuller, October 18, 1932. Thus, the rollers are set at such an angle that, as an operator rotates the series of bars or braces 5 around the pipe, the rollers and parts secured thereto are caused also to rotate as well as to advance along the pipe in a forwardly manner.

The reservoir 6 for the fluid that is to be used for coating is suspended by elements 7 and 8 that may be rods or bails depending from the framework 9, which, in turn, is supported by the said rollers and accessories. The elements 7 and 8 have curved hook like ends carrying antifriction rollers 10 and 11 which ride upon the annular hubs 9' on the frame, so that, as the frame rotates around the pipe, the reservoir depends in non-rotating manner. The fact that the reservoir does not rotate with the remainder of the machine makes possible the heating of the reservoir and fluid 11 contained therein conveniently and uniformly as, for example, by non-rotatable means such as the oil flame 12. Also, the non-rotating reservoir may be kept filled to a selected height by means of coating material supplied thereto substantially continuously, if desired, thru the charging inlet 13. The reservoir of this type may be closed satisfactorily against the escape of vapors therefrom and against irregular cooling, by means of the lid member 14, disposed as a cover over the forward part of the reservoir and the casing or hood 15 supported by the rear portion of the reservoir. The hood extends upwardly around the conveyor system shortly to be described, and slideably engages, as illustrated, at 16 with the annular metal sheet or plate 17, the sheet 17 being carried by the rear hub 9' of the rotating frame. To readily adapt the machine for engagement and disengagement from pipes, the plate is divided and provided with a hinge at 2' and a latch arrangement at 3'. The closing member and end piece described define a chamber which is provided suitably with a ventilator flue having the adjustable damper 18 therein, for controlling the escape of vapors from the chamber or the temperature of the atmosphere therein.

The machine includes, as a part of the coating means, the reservoir described and also a series of conveyor buckets or cups which dip up the coating fluid from the reservoir and discharge it upon the pipe at a position exclusively posterior with respect to the position at which the rollers support the machine upon the pipe.

Conveyor buckets or cup-like members of open face are illustrated at 19, Fig. 2. These members are adjustably supported at 25 upon the annular plate 17. Extending inwardly towards this pipe are troughs 20 which are also adjustably supported upon members 25. These troughs or directing elements are provided with inwardly extending spring steel plates or elements 22, which terminate at positions adjacent to the pipe. These elements carry the coating material to the pipe and smooth it, to obliterate air holes or flaws therein, when the material first strikes the pipe in warm and relatively fluent condition. The smoothing elements 22 constitute a part of the socalled directing elements and are secured to the element 20 by means of bolts 27. The elements 22 and troughs 20 are adjustable, as to spacing from the pipe, by means of the bolt 25 extending thru a pivot mounting. In the assembly of conveyor buckets, directing elements, and smoothing means, the inclination around the pivot points 25 affects not only the spacing of the ends of the smoothing elements from the pipe, but also, the distance of the conveyor buckets from the axis of rotation of the system (this axis being fixed) and, consequently, the depth to which the buckets enter the liquid in the reservoir as they pass therethrough. This inclination affects also the pitch of the face of the conveyor member with respect to the said axis, whereby the dipping capacity of the member is determined. Thus the amount of liquid dipped from the reservoir containing liquid at an established level for each passage of the bucket therethrough may be fixed in predetermined manner.

Also the inclination of the elements 20 and 22, with respect to the axis of rotation of the conveyor system, that is, to the length of the pipe, is adjustable at the pivot bolt mounting 23; by means of this adjustment, the place of discharge of the elevated liquid upon the pipe may be established.

The attachment of the conveyor system to the supporting means is made indirectly by means of the lug 24 secured by the bolt 25, as indicated, to the split plate 17, which, in turn, is bolted at 26 to the rear hub of the rotating carriage.

In addition to the smoothing elements 22 there are provided additional elements 28 consisting of metal sheets having each the forward edge shaped into an up-turned lip, as illustrated at 29, and secured adjustably by the bar 30 to the bracket 31, which, in turn, is adjustably secured to the plate 17 as indicated at 32 and 33. These elements 28 are spaced from the pipe at a predetermined distance, at a position after or posterior to the primary smoothing elements 22. The elements 28 give to the coating material applied warm additional smoothing, after the material has been on the pipe for a moment and has been cooled to a substantial extent and thereby increased in viscosity. The elements 28, contacting with the partially cooled coating material, serve also, in part, to maintain the proper alignment of the rearward part of the machine.

Finally, there is provided around the pipe 1 a yieldable annular gasket 34 secured at its outer edge to the plate 17 and, contacting at its inner edge in sealing manner with the pipe at a position between the rearward series of rollers 4 and the position of discharge of coating liquid upon the pipe, to prevent flow of the coating in the direction of the rollers.

Through the rear closing member 15 is an opening with tapered sides 35 that is sufficiently large to allow the passage therethrough of the pipe and the coating of selected thickness.

The various parts of the machine may be constructed of suitable metal, such as steel.

The operation of the machine should be evident from the description that has been given.

The machine is assembled around the pipe that is to be coated, by the hinge and latch arrangements disclosed, and coating material is charged to the desired amount in the reservoir, heat is supplied to the lower portion of the reservoir, as illustrated, to raise the temperature of the coating material to the desired point, and then the operator, grasping the bars 5, rotates the rotatable part of the mechanism around the pipe. As the mechanism rotates, it advances along the pipe, the rate of rotation as compared to the rate of advance in forwardly manner being predetermined by the setting of the angle of the rollers 4 with respect to the length of the pipe.

As the machine is rotated the bucket conveyor system elevates the coating fluid from the reservoir and, at an elevated position, discharges it as a practically steady stream, downward along the trough-like directing elements 20 and spring plates 22, to the outside of the pipe, exclusively at a position posterior to that of the rollers 4. These plates apply and smooth the coating material to the pipe, and the plates 28 further smooth the coating after it has partially cooled. The inclined annular lip 35 also aids in smoothing the material to the pipe.

In this manner the objectionable fouling of the rollers or their sticking in the viscous coating material is obviated.

Because the reservoir extends both forwardly and backwardly, beyond the point of discharge of the coating liquid from the conveyor system, any excess of coating liquid above that which remains on the pipe is collected in the reservoir and is not lost.

The damper to the chamber surrounding the conveyor system not only assists in controlling the temperature inside the chamber and in avoiding drafts but also contributes materially to the comfort of the operator.

It will be understood that the details given are illustrative and not restrictive and that variations within the scope of the claims may be made without departing from the spirit of the invention.

What I claim is:

1. In a machine for applying a coating of a hardenable liquid to the outside of a pipe, the improvement comprising in combination supporting means engaging the pipe and permitting movement of the machine forwardly along the pipe, coating means including a non-rotatable reservoir for the coating liquid, open-faced, rotatable cup-like conveyor members, means for causing the said members to dip up the liquid from the reservoir, elevate the liquid, and discharge it upon the pipe and means for controlling the pitch of the face of the conveyor members with respect to the radius of rotation thereof, whereby the dipping capacity of the said members is determined.

2. In a machine for applying a coating liquid to a pipe, the improvement comprising in combination a cage-like assembly extending around the pipe, a plurality of rollers engaging the pipe and supporting the assembly rotatably and movably in a forward direction thereon, a reservoir for the coating liquid suspended in non-rotatable manner, non-rotatable means warming the liquid in the reservoir, a series of rotatable conveyor members for elevating liquid from the reservoir and supplying it to the pipe at a position exclusively posterior to the said rollers and at approximately a predetermined distance therefrom, means for smoothing the thus supplied coating in warm condition, and a follower plate, having an upturned forward edge for further smoothing the coating in partially cooled condition.

3. In a machine for applying a coating of a hardenable liquid to the outside of a pipe, the improvement comprising in combination supporting means engaging the pipe and permitting movement of the machine forwardly along the pipe and coating means for supplying the coating liquid to the pipe, the coating means including a non-rotatable reservoir for the coating liquid, a plurality of conveyor members adapted to be supplied with liquid from the reservoir, to be rotated around the pipe, and to elevate the liquid and discharge it at a position above the pipe, and means extending from the several conveyor members to the pipe for directing the discharged liquid from the said position to the pipe.

4. In a machine for applying a coating of a hardenable liquid to the outside of a pipe, the improvement comprising in combination supporting means engaging the pipe and permitting movement of the machine forwardly along the pipe, a non-rotatable reservoir for the coating liquid, a plurality of conveyor members, adapted to be supplied with liquid from the reservoir, to be rotated around the pipe, and to elevate the liquid and discharge it at a position above the pipe and means extending from the several conveyor members to the pipe for directing the discharged liquid from the said position to the pipe.

5. In a pipe coating machine, a frame rotatable on said pipe as an axis, angularly disposed rollers mounted on said frame to support said frame on said pipe and to advance it therealong upon rotation of the frame, a non-rotatable reservoir carried by said frame, and means on said frame for elevating the coating material from the reservoir to the pipe.

6. In a pipe coating machine, a frame rotatable on said pipe as an axis, angularly disposed rollers mounted on said frame to support said frame on said pipe and to advance it therealong upon rotation of the frame, a non-rotatable reservoir carried by said frame, means on said frame for elevating the coating material from the reservoir to the pipe, and means carried by said rotating frame for spreading said coating material on the pipe.

DORNE N. HALSTEAD.